(12) United States Patent
Tangirala et al.

(10) Patent No.: US 11,778,038 B2
(45) Date of Patent: Oct. 3, 2023

(54) SYSTEMS AND METHODS FOR SHARING A CONTROL CONNECTION

(71) Applicant: Cisco Technology, Inc., San Jose, CA (US)

(72) Inventors: Srilatha Tangirala, San Jose, CA (US); Rahul Hardikar, San Ramon, CA (US); Sheikh Qumruzzaman, Santa Clara, CA (US); Ravi Kiran Chintallapudi, Pleasanton, CA (US); Samir Thoria, Saratoga, CA (US); Ajeet Pal Singh Gill, Fremont, CA (US); Vivek Agarwal, Campbell, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/709,877

(22) Filed: Mar. 31, 2022

(65) Prior Publication Data

US 2023/0188607 A1   Jun. 15, 2023

Related U.S. Application Data

(60) Provisional application No. 63/265,385, filed on Dec. 14, 2021.

(51) Int. Cl.
*H04L 67/141* (2022.01)
*H04L 9/40* (2022.01)
(Continued)

(52) U.S. Cl.
CPC ......... *H04L 67/141* (2013.01); *H04L 41/122* (2022.05); *H04L 45/76* (2022.05); *H04L 63/0428* (2013.01)

(58) Field of Classification Search
CPC . H04L 1/1819; H04L 41/147; H04L 43/0829; H04L 43/0847; H04L 43/0852
See application file for complete search history.

(56) References Cited

U.S. PATENT DOCUMENTS 9,467,478 B1 * 10/2016 Khan .................. H04L 63/0209
10,826,775 B1   11/2020 Moreno et al.
(Continued)

FOREIGN PATENT DOCUMENTS

WO   2021211949 A1   10/2021

OTHER PUBLICATIONS

International Search Report and Written Opinion corresponding to PCT Application No. PCT/US2022/080876, dated Mar. 15, 2023, 28 pages.
(Continued)

*Primary Examiner* — Bryan Y Lee
(74) *Attorney, Agent, or Firm* — Baker Botts L.L.P.

(57) ABSTRACT

In one embodiment, a method includes onboarding, by an edge router, a first tenant from a network management system and determining, by the edge router, a mapping of a tenant identifier associated with the first tenant to a controller identifier associated with a controller. The method also includes reserving, by the edge router, a port number in a kernel for the first tenant and inserting, by the edge router, the tenant identifier into a first control packet. The method further includes communicating, by the edge router, the first control packet to the controller via an encrypted control connection during a first peering session. The first peering session shares the encrypted control connection with a second peering session.

17 Claims, 3 Drawing Sheets

(51) Int. Cl.
  *H04L 45/76* (2022.01)
  *H04L 41/122* (2022.01)

(56) References Cited

U.S. PATENT DOCUMENTS

| | | |
|---|---|---|
| 2013/0287026 A1* | 10/2013 | Davie ................ H04L 12/4641 |
| | | 370/392 |
| 2015/0146736 A1 | 5/2015 | Kawai |
| 2018/0109493 A1 | 4/2018 | Khan et al. |
| 2019/0273681 A1 | 9/2019 | Williams et al. |
| 2020/0177503 A1 | 6/2020 | Hooda et al. |
| 2021/0067442 A1 | 3/2021 | Sundararajan et al. |

OTHER PUBLICATIONS

"Cisco SD-WAN Design Guide", Sep. 2020 (Sep. 2020), XP093028951, 102 pages, Retrieved from the Internet: URL:https://web.archive.org/web/20210806133945if_/https://www.cisco.com/c/en/us/td/docs/solutions/CVD/SDWAN/ cisco-sdwan-design-guide.pdf [retrieved on Mar. 3, 2023] p. 26-p. 28.

* cited by examiner

SYSTEMS AND METHODS FOR SHARING A CONTROL CONNECTION

CROSS-REFERENCE TO RELATED APPLICATIONS

This application claims benefit of U.S. Provisional Patent Application No. 63/265,385 filed Dec. 14, 2021 by Srilatha Tangirala, and entitled "EFFICIENT CONTROL PLANE PROTOCOL HANDLING ON MULTI-TENANT EDGES," which is incorporated herein by reference as if reproduced in its entirety.

TECHNICAL FIELD

The present disclosure relates generally to communication networks, and more specifically to systems and methods for sharing a control connection in a software-defined wide area network (SD-WAN) environment.

BACKGROUND

Multi-tenancy is a concept that refers to the logical isolation of shared virtual compute, storage, and/or network resources. In a multi-tenancy mode of operation, multiple independent instances (e.g., Layer-3 virtual routing and forwarding instances (VRFs) or Layer-2 virtual local area network instances (VLANs)) of a tenant (e.g., a business entity, a user group, applications, security, etc.) operate in a shared environment while ensuring logical segmentation between the instances. Service providers may use multi-tenancy to achieve effective utilization of network components.

DESCRIPTION OF EXAMPLE EMBODIMENTS

Overview

Figure 1:
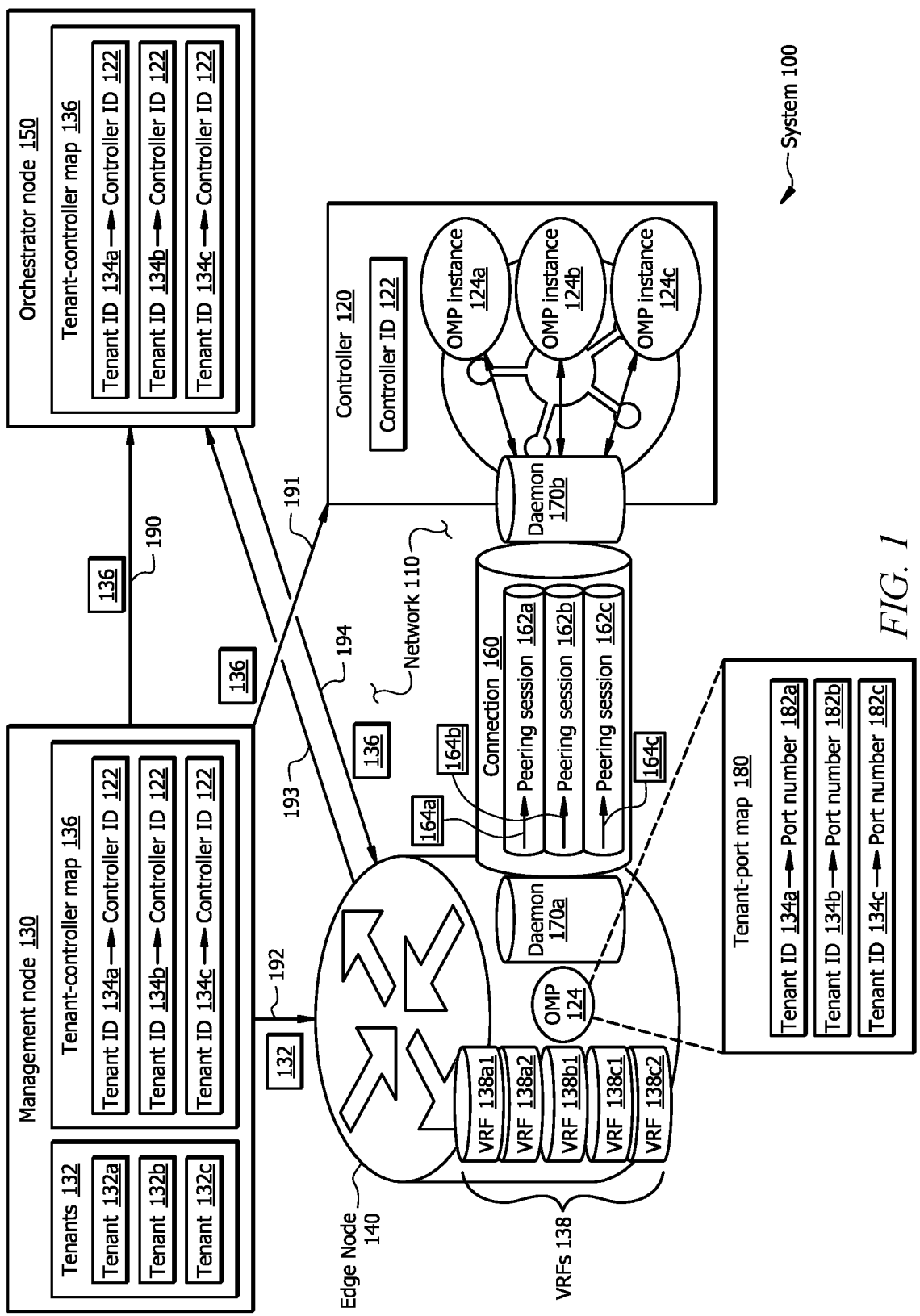
FIG. 1 illustrates an example system for sharing a control connection in an SD-WAN environment.

According to an embodiment, an edge router includes one or more processors and one or more computer-readable non-transitory storage media coupled to the one or more processors and including instructions that, when executed by the one or more processors, cause the edge router to perform operations. The operations include onboarding a first tenant from a network management system and determining a mapping of a tenant identifier associated with the first tenant to a controller identifier associated with a controller. The operations also include reserving a port number in a kernel for the first tenant and inserting the tenant identifier into a first control packet. The operations further include communicating the first control packet to the controller via an encrypted control connection during a first peering session. The first peering session shares the encrypted control connection with a second peering session.

In certain embodiments, the operations include onboarding a second tenant from the network management system. The first tenant may be associated with the first peering session and a first VRF instance, and/or the second tenant may be associated with the second peering session and a second VRF instance. In some embodiments, the controller uses the tenant identifier to determine the first VRF instance. In certain embodiments, the tenant identifier is a global, 16-bit identifier that uniquely identifies the first tenant.

In some embodiments, the operations include establishing, by a daemon installed on the edge router, the encrypted control connection with the controller, notifying, by the daemon, an Overlay Management Protocol (OMP) of the encrypted control connection, and communicating, by the OMP, an association between the port number and the tenant identifier to the daemon.

In certain embodiments, the operations include receiving a second control packet from the controller via the encrypted control connection, decrypting the second control packet, identifying a destination port associated with the second control packet, writing the second control packet to the kernel, and/or determining, by the kernel, to place the second control packet on a socket based on the destination port.

In some embodiments, the encrypted control connection is a Datagram Transport Layer Security (DTLS) control connection, the router is an SD-WAN edge router, and the port is a Transmission Control Protocol (TCP) port.

According to another embodiment, a method includes onboarding, by an edge router, a first tenant from a network management system and determining, by the edge router, a mapping of a tenant identifier associated with the first tenant to a controller identifier associated with a controller. The method also includes reserving, by the edge router, a port number in a kernel for the first tenant and inserting, by the edge router, the tenant identifier into a first control packet. The method further includes communicating, by the edge router, the first control packet to the controller via an encrypted control connection during a first peering session. The first peering session shares the encrypted control connection with a second peering session.

According to yet another embodiment, one or more computer-readable non-transitory storage media embody instructions that, when executed by a processor, cause the processor to perform operations. The operations include onboarding a first tenant from a network management system and determining a mapping of a tenant identifier associated with the first tenant to a controller identifier associated with a controller. The operations also include reserving a port number in a kernel for the first tenant and inserting the tenant identifier into a first control packet. The operations further include communicating the first control packet to the controller via an encrypted control connection during a first peering session. The first peering session shares the encrypted control connection with a second peering session.

Technical advantages of certain embodiments of this disclosure may include one or more of the following. Multi-tenancy in the control plane can be achieved by creating a separate control connection per-tenant. Separate control connections require the addition of more end points, which increases overhead on the system. With multiple control connections to the controllers, the cost to poll the connections increases. This makes it challenging to achieve higher scalability. Certain embodiments of this disclosure include systems and methods for scaling out multi-tenancy on SD-WAN edge devices by developing a shared control plane infrastructure across the tenants, which allows the delivery of a cloud scale architecture. A centralized network management system's placement logic of the tenants' association to the controllers allows for high performance optimization. By multiplexing several tenants into a shared control connection infrastructure, controllers can be more efficiently utilized to achieve higher scalability.

In certain embodiments, a network management system generates a global, 2 byte (16-bit) tenant identifier for each tenant and inserts the tenant identifier rather than a tenant name (which is 128 bytes long) into control packets to uniquely identify a tenant, which reduces the size of the control packets. This also helps in preventing fragmentation of the control packet between controllers (e.g., a controller or an orchestrator) and routers (e.g., an edge router). In certain embodiments, the global tenant identifier is used in the stack on the edge router to infer the tenant keys for lookup, which reduces the storage space used in the databases/trees.

In some embodiments, the control plane interfaces are optimized to achieve multi-tenancy with minimal overhead such that the overall service and/or output using the system resources is increased. In certain embodiments, the total number of control connections to controllers are reduced per-tenant compared to traditional multi-tenant solutions. For example, if a multi-tenant edge device has 100 tenants and each tenant is mapped to two controllers, 200 (2×100) control connections are used through one transport interface on the multi-tenant edge device. For a controller with eight transport interfaces, the total number of connections would be 100 connections per-tenant times two controllers times eight transport interfaces, or 1600 connections (100×2×8). In certain embodiments of this disclosure, two controllers with eight transport interfaces and one connection per controller for all 100 tenants equals 16 control connections (1×2×8), which brings down the control connection count by 1584 connections. Reducing the number of control connections reduces the total resources used on the system. For example, the number of sockets used for creating the control connection is reduced. As another example, the amount of memory on the system is reduced. As still another example, the bandwidth is reduced since the number of hello packets sent every second on every control connection is reduced.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for sharing a control connection in an SD-WAN environment. In certain embodiments, multi-tenancy is used to achieve effective utilization of SD-WAN components. Multiple tenants are placed on a single edge device or single gateway. In some embodiments, tenants use overlapping prefixes. Certain embodiments of this disclosure advertise each tenant's route to a controller by sharing one secured control connection across all the tenants, which may reduce the operational cost and overhead on the system.

FIG. 1 illustrates an example system 100 for sharing a control connection in an SD-WAN environment. System 100 or portions thereof may be associated with an entity, which may include any entity, such as a business, company, or enterprise, that shares control connections in an SD-WAN environment. In certain embodiments, the entity may be a service provider that provides services for sharing control connections. The components of system 100 may include any suitable combination of hardware, firmware, and software. For example, the components of system 100 may use one or more elements of the computer system of FIG. 3. In the illustrated embodiment of FIG. 1, system 100 includes a network 110, a controller 120, controller identifier 122, OMP instances 124, a management node 130, tenants 132, tenant identifiers 134, a tenant-controller map 136, VRFs 138, an edge node 140, an orchestrator node 150, a control connection 160, peering sessions 162, packets 164, daemons 170, a tenant-port map 180, and port numbers 182.

Network 110 of system 100 is any type of network that facilitates communication between components of system 100. Network 110 may connect one or more components of system 100. One or more portions of network 110 may include an ad-hoc network, the Internet, an intranet, an extranet, a virtual private network (VPN), an Ethernet VPN (EVPN), a LAN, a wireless LAN (WLAN), a VLAN, a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. Network 110 may include a core network, an access network of a service provider, an Internet service provider (ISP) network, and the like. One or more components of system 100 may communicate over network 110. In the illustrated embodiment of FIG. 1, network 110 is an SD-WAN.

Network 110 may include one or more nodes. Nodes are connection points within network 110 that receive, create, store and/or send data along a path. Nodes may include one or more redistribution points that recognize, process, and forward data to other nodes of network. Nodes may include virtual and/or physical nodes. Nodes may include one or more virtual machines, hardware devices, bare metal servers, and the like. As another example, nodes may include data communications equipment such as computers, routers, servers, printers, workstations, switches, bridges, modems, hubs, and the like. In certain embodiments, nodes use static and/or dynamic routing to send data to and/or receive data to other nodes of system 100. In the illustrated embodiment of FIG. 1, nodes include controller 120, a management node 130, edge node 140, and an orchestrator node 150.

Controller 120 of system 100 monitors, operates, manages, troubleshoots, and/or maintains services related to network 110. In certain embodiments, controller 120 is a centralized controller that oversees the control plane of network 110. Controller 120 may manage provisioning, maintenance, and/or security for network 110. In some embodiments, controller 120 is primarily involved in control plane communication and does not handle data traffic. However, controller 120 may control the flow of data traffic throughout network 110. In certain embodiments, controller 120 works with orchestrator node 150 of system 100 to authenticate edge node 140 as edge node 140 joins network 110. In certain embodiments, controller 120 is assigned a controller identifier 122. Controller identifier 122 is any representation that uniquely identifies controller 120. For example, controller identifier 122 may be a Unique Device Identifier (UDI).

Management node 130 of system 100 is a centralized network management system that allows a user to configure and/or manage the overlay network of network 110. In certain embodiments, management node 130 includes a dashboard (e.g., a graphical dashboard). The dashboard of management node 130 may provide a visual window into network 110 that allows a user to configure and/or manage edge node 140. In certain embodiments, management node 130 is software that runs on one or more servers of network 110. This server may be situated in a centralized location (e.g., a data center). In certain embodiments, the software of management node 130 may run on the same physical server as the software of another network component (e.g., controller 120).

In certain embodiments, a user creates tenants 132 in the centralized network management system of management node 130. Tenants 132 (e.g., tenant 132a, tenant 132b, and tenant 132c) are logical containers for application policies. Tenants 132 may allow administrators to exercise domain-based access control. In certain embodiments, tenants 132 are units of isolation from a policy perspective. Tenants 132 may represent customers in a service provider setting, organizations or domains in an enterprise setting, groups of policies, and the like. Tenants 132 may include one or more filters, contracts, outside networks, bridge domains, VRFs 138, application profiles, etc.

In some embodiments, each tenant 132 (e.g., tenant 132a, tenant 132b, and tenant 132c) is associated with a tenant name (e.g., a tenant organization name). The tenant name is 128 bits long. In certain embodiments, each tenant 132 (e.g., tenant 132a, tenant 132b, and tenant 132c) is associated with a tenant identifier 134 (e.g., tenant identifier 134a, tenant identifier 134b, and tenant identifier 134c). Tenant identifiers 134 uniquely identify tenants 132. For example, tenant identifier 134a uniquely identifies tenant 132a, tenant identifier 134b uniquely identifies tenant 132b, and tenant identifier 134c uniquely identifies tenant 132c. In certain embodiments, management node 130 generates tenant identifiers 134. Each tenant identifier 134 is a global, 16-bit identifier.

In some embodiments, management node 130 generates tenant-controller map 136. For example, management node 130 may include a placement logic that generates tenant-controller map 136 by mapping tenants 132 to controller 120 based on an expected device count. Tenant-controller map 136 may be a JavaScript Object Notation (JSON) map, a YAML map, and the like. In the illustrated embodiment of FIG. 1, tenant-controller map 136 includes a mapping of tenant identifier 134a to controller identifier 122, a mapping of tenant identifier 134b to controller identifier 122 and a mapping of tenant identifier 134c to controller identifier 122. In certain embodiments, management node 130 communicates tenant-controller map 136 to orchestrator node 150 (see notation 190) and/or controller 120 (see notation 191). In some embodiments, management node 130 communicates tenant-controller map 136 to orchestrator node 150 (see notation 190) and/or controller 120 (see notation 191) once tenant-controller map 136 is complete.

Edge node 140 of system 100 is a connection point (e.g., an edge router) within network 110 that receives, creates, stores, and/or communicates data along a path. Edge node 140 provides one or more interfaces for communicating with other nodes of network 110. In certain embodiments, edge node 140 is single device for connecting and/or securing enterprise traffic to the cloud. Edge node 140 may include one or more hardware devices, software (e.g., a cloud router) that runs as a virtual machine, and the like. In some embodiments, edge node 140 handles the transmission of data traffic.

In certain embodiments, edge node 140 onboards one or more tenants 132 from management node 130. For example, edge node 140 may be configured to define the infrastructure boundaries and/or resource limits that are applied automatically when a user makes a service request, via a dashboard of management node 130, to provision one or more tenants 132. In some embodiments, edge node 140 onboards one or more VRFs 138 associated with tenants 132.

VRF is a technology that allows multiple instances of a routing table to co-exist within the same router (e.g., edge node 140) at the same time. VRFs 138 (e.g., VRF 138a1, VRF 138a2, VRF 138b1, VRF 138c1, and VRF 138c2) of system 100 represent tenant networks (e.g., contexts or private networks). In certain embodiments, each VRF 138 is a unique Layer 3 forwarding and application policy domain. Each VRF 138 may define a Layer 3 address domain. In certain embodiments, edge node 140 may configure and/or assign one or more VRFs 138. Each VRF 138 may be associated with one or more bridge domains. After an administrator creates a logical device, the administrator may create one or more VRFs 138 for the logical device, which may provide a selection criteria policy for a device cluster. A logical device may be selected based on a contract name, a graph name, the function node name inside the graph, etc. In the illustrated embodiment of FIG. 1, tenant 132a includes VRF 138a1 and VRF 138a2, tenant 132b incudes VRF 138b1, and tenant 132c includes VRF 138c1 and VRF 138c2. One or more VRFs 138 may be associated with a different department (e.g., finance, engineering, sales, human resources, marketing, etc.).

In certain embodiments, edge node 140 establishes and maintains connection 160 with controller 120 of network 110. Connection 160 of system 100 is a secure, encrypted control plane connection. In certain embodiments, connection 160 runs as a Datagram Transport Layer Security (DTLS) tunnel between edge node 140 and controller 120. In some embodiments, edge node 140 initiates one or more peering sessions 162 with controller 120 via connection 160. Peering sessions 162 are used to exchange control plane traffic between edge node 140 and controller 120. In the illustrated embodiment of FIG. 1, peering session 162a is associated with tenant 132a, VRF 138a1, and VRF 138a2; peering session 162b is associated with tenant 132b and VRF 138b1; and peering session 162c is associated with tenant 132c, VRF 138c1, and VRF 138c2.

In certain embodiments, peering sessions 162 are OMP peering sessions 152. OMP 124 is the protocol responsible for establishing and maintaining the control plane. OMP 124 may orchestrate the overlay network communication, including connectivity among network sites, service chaining, and VPN or VRF topologies. OMP 124 may distribute service-level routing information and related location mappings, data plane security parameters, routing policies, and the like. In certain embodiments, OMP 124 is used to exchange routing, policy, and/or management information between edge node 140 and controller 120 in network 110. In some embodiments, OMP routes advertise VRFs 138 (e.g., VRF 138a1) to which the routes belong. In certain embodiments, an OMP hold time determines how long to wait before closing control connection 160. For example, if the peer (e.g., edge node 140 or controller 120) does not receive three consecutive keepalive messages within the hold time, connection 160 to the peer may be closed.

In certain embodiments, edge node 140 includes daemon 170a. Daemon 170a is a computer program that runs as a background process (rather than being under the direct control of an interactive user). Daemon 170a may be locally installed on edge node 140. In certain embodiments, daemon 170a brings up connection 160 with controller 120. Daemon 170*a* may bring up connection 160 only if connection 160 is set up for the first time to controller 120. In some embodiments, after connection 160 comes up, daemon 170*a* notifies OMP 124 of connection 160 by sending a control-device-add message via a Tunnel Table manager (TTM).

In certain embodiments, OMP 124 reserves one or more port numbers 182 (e.g., Transmission Control Protocol (TCP) port numbers) on edge node 140. Port numbers 182 (e.g., port number 182*a*, port number 182*b*, and port number 182*c*) are numbers (e.g., a 16-bit unassigned number) used to identify each port for each transport protocol and/or address combination. In certain embodiments, OMP 124 may reserve port number 182*a* in a kernel for peering session 162*a* (associated with tenant 132*a*); OMP 124 may reserve port number 182*b* in a kernel for peering session 162*b* (associated with tenant 132*b*); and OMP 124 may reserve port number 182*c* in a kernel for peering session 162*c* (associated with tenant 132*c*).

In certain embodiments, OMP 124 generates tenant-port map 180. OMP 124 may generate tenant-port map 180 by associating tenant identifiers 134 with reserved port numbers 182. For example, OMP 124 may associate tenant identifier 134*a* (representing tenant 132*a*) with reserved port number 182*a*; OMP 124 may associate tenant identifier 134*b* (representing tenant 132*b*) with reserved port number 182*b*; and OMP 124 may associate tenant identifier 134*c* (representing tenant 132*c*) with reserved port number 182*c*. In some embodiments, OMP 124 communicates tenant-port map 180 to local daemon 170*a*.

In certain embodiments, daemon 170*a* of edge node 140 communicates packets 164 to controller 120 via connection 160. Packets 164 are formatted units of data carried by network 110. Packets 164 may be any suitable types of packets (e.g., TCP packets or User Datagram Protocol (UDP) packets). Packets 164 include control information, which provides data for delivering user data (e.g., payload). In the illustrated embodiment of FIG. 1, daemon 170*a* communicates packet 164*a* to controller 120 via peering session 162*a* of connection 160; daemon 170*a* communicates packet 164*b* to controller 120 via peering session 162*b* of connection 160; and daemon 170*a* communicates packet 164*c* to controller 120 via peering session 162*c* of connection 160. In certain embodiments, daemon 170*a* inserts an appropriate tenant identifier 134 into every packet 164. For example, in the illustrated embodiment of FIG. 1, daemon 170*a* inserts tenant identifier 134*a* into packet 164*a*; daemon 170*a* inserts tenant identifier 134*b* into packet 164*c*; and daemon 170*a* inserts tenant identifier 134*c* into packet 164*c*.

In certain embodiments, daemon 170*a* communicates packets 164 via encrypted, secured connection 160 to controller 120. Controller 120 may run multiple OMP instances 124, one per tenant 132. For example, controller 120 may run OMP instance 124*a* for tenant 132*a*; controller 120 may run OMP instance 124*b* for tenant 132*b*; and controller 120 may run OMP instance 124*c* for tenant 132*c*. In some embodiments, controller 120 includes daemon 170*b*. Daemon 170*b* is a computer program that runs as a background process (rather than being under the direct control of an interactive user). Daemon 170*b* may be locally installed on controller 120.

In certain embodiments, daemon 170*b* maintains a mapping of tenant identifier 134 to tenant context for demultiplexing. In some embodiments, when controller 120 receives packet 164 (e.g., packet 164*a*, packet 164*b*, or packet 164*c*), daemon 170*b* identifies the tenant context based on tenant identifier 134 (e.g., tenant identifier 134*a*, tenant identifier 134*b*, or tenant identifier 134*c*, respectively) and relays packet 164 to the appropriate OMP instance 124 (e.g., OMP instance 124*a*, OMP instance 124*b*, or OMP instance 124*c*, respectively). OMP peering comes up when peering session 162 (e.g., peering session 162*a*, peering session 162, or peering session 162*c*) is established. In the reverse direction, daemon 170*a* of edge node 140 decrypts packet 164 and writes packet 164 to the kernel. In certain embodiments, the kernel places packet 164 on the appropriate socket. The kernel may place packet 164 on the appropriate socket based the destination port (e.g., port number 182) of packet 164. In certain embodiments, the destination port is included in a four-tuple. Other information included in the four-tuple may also be used to place packet 164 on the appropriate socket.

Orchestrator node 150 of system 100 automatically orchestrates connectivity between edge node 140 and controller 120 of system 100. In certain embodiments, orchestrator node 150 is software that runs as a process (e.g., a daemon) on edge node 140 and/or controller 120. In certain embodiments, orchestrator node 150 has a persistent control plane connection (e.g., a DTLS tunnel connection) with controller 120. In the illustrated embodiment of FIG. 1, orchestrator node 150 communicates with edge node 140. For example, orchestrator node 150 may use a DTLS connection to communicate with edge node 140 when edge node 140 comes online. Orchestrator node 150 may authenticate edge node 140 and facilitate the ability of edge node 140 to join network 110.

In certain embodiments, orchestrator node 150 receives (see notation 190) tenant-controller map 136 from management node 130. Orchestrator node 150 may communicate tenant-controller map 136 to edge node 140. For example, orchestrator node 150 may communicate (see notation 194) tenant-controller map 136 to edge node 140 in response to receiving (see notation 193) a request from edge node 140 for information related to a particular tenant 132 (e.g., tenant-controller map 136).

In operation, management node 130 of system 100 creates tenants 132 (e.g., tenant 132*a*, tenant 132*b*, and tenant 132*c*). For example, a user (e.g., a service provider) may create tenants 132 in a centralized network management system of management node 130. Management node 130 generates tenant-controller map 136, which maps tenants 132 to controller 120. Once tenant-controller map 136 is complete, management node 130 communicates tenant-controller map 136 to orchestrator node 150 (see notation 190) and controller 120 (see notation 191). Tenants 132 are then onboarded (see notation 192) onto edge node 140 from management node 130. Edge node 140 requests (see notation 193) information associated with tenants 132 from orchestrator node 150, and orchestrator node 150 communicates (see notation 194) tenant-controller map 136 to edge node 140. OMP 124 on edge node 140 reserves port number 182*a*, port number 182*b*, and port number 182*c* in kernels for tenant 132*a*, tenant 132*b*, and tenant 132*c*, respectively, and generates tenant-port map 180. OMP 124 informs daemon 170*a* installed locally on edge node 140 about tenant-port map 180, and daemon 170*a* inserts appropriate tenant identifier 134 (e.g., tenant identifier 134*a*, tenant identifier 134*b*, or tenant identifier 134*c*) in every TCP control packet 164 (e.g., packet 164*a*, packet 164*b*, and packet 164*c*). Edge node 140 then communicates control packets 164 (e.g., packet 164*a*, packet 164*b*, and packet 164*c*) to controller 120 via encrypted control connection 160. Controller 120 runs OMP instance 124*a*, OMP instance 124*b*, and OMP instance 124*c* for tenant 132*a*, tenant 132*b*, and tenant 132*c*, respectively. Daemon 170*b* installed locally on controller 120 maintains a mapping of tenant identifiers 134 to tenant context for demultiplexing. When controller 120 receives packet 164a, for example, daemon 170b locates the tenant context for tenant 132a based on tenant identifier 134a and communicates packet 164a to the appropriate OMP instance 124a. As such, by multiplexing several tenants 132 (e.g., tenant 132a, tenant 132b, and tenant 132c) onto a single shared control connection 160, controller 120 is more efficiently utilized to achieve higher scalability.

Although FIG. 1 illustrates a particular number of networks 110, controllers 120, controller identifiers 122, OMP instances 124, management nodes 130, tenants 132, tenant identifiers 134, tenant-controller maps 136, VRFs 138, edge nodes 140, orchestrator nodes 150, control connections 160, peering sessions 162, packets 164, daemons 170, tenant-port maps 180, and port numbers 182, this disclosure contemplates any suitable number of networks 110, controllers 120, controller identifiers 122, OMP instances 124, management nodes 130, tenants 132, tenant identifiers 134, tenant-controller maps 136, VRFs 138, edge nodes 140, orchestrator nodes 150, control connections 160, peering sessions 162, packets 164, daemons 170, tenant-port maps 180, and port numbers 182. For example, system 100 may include more or less than three tenants 132.

Although FIG. 1 illustrates a particular arrangement of network 110, controller 120, controller identifiers 122, OMP instances 124, management node 130, tenants 132, tenant identifiers 134, tenant-controller map 136, VRFs 138, edge node 140, orchestrator node 150, control connection 160, peering sessions 162, packets 164, daemons 170, tenant-port map 180, and port numbers 182, this disclosure contemplates any suitable arrangement of network 110, controller 120, controller identifiers 122, OMP instances 124, management node 130, tenants 132, tenant identifiers 134, tenant-controller map 136, VRFs 138, edge node 140, orchestrator node 150, control connection 160, peering sessions 162, packets 164, daemons 170, tenant-port map 180, and port numbers 182. Furthermore, although FIG. 1 describes and illustrates particular components, devices, or systems carrying out particular actions, this disclosure contemplates any suitable combination of any suitable components, devices, or systems carrying out any suitable actions.

Figure 2:
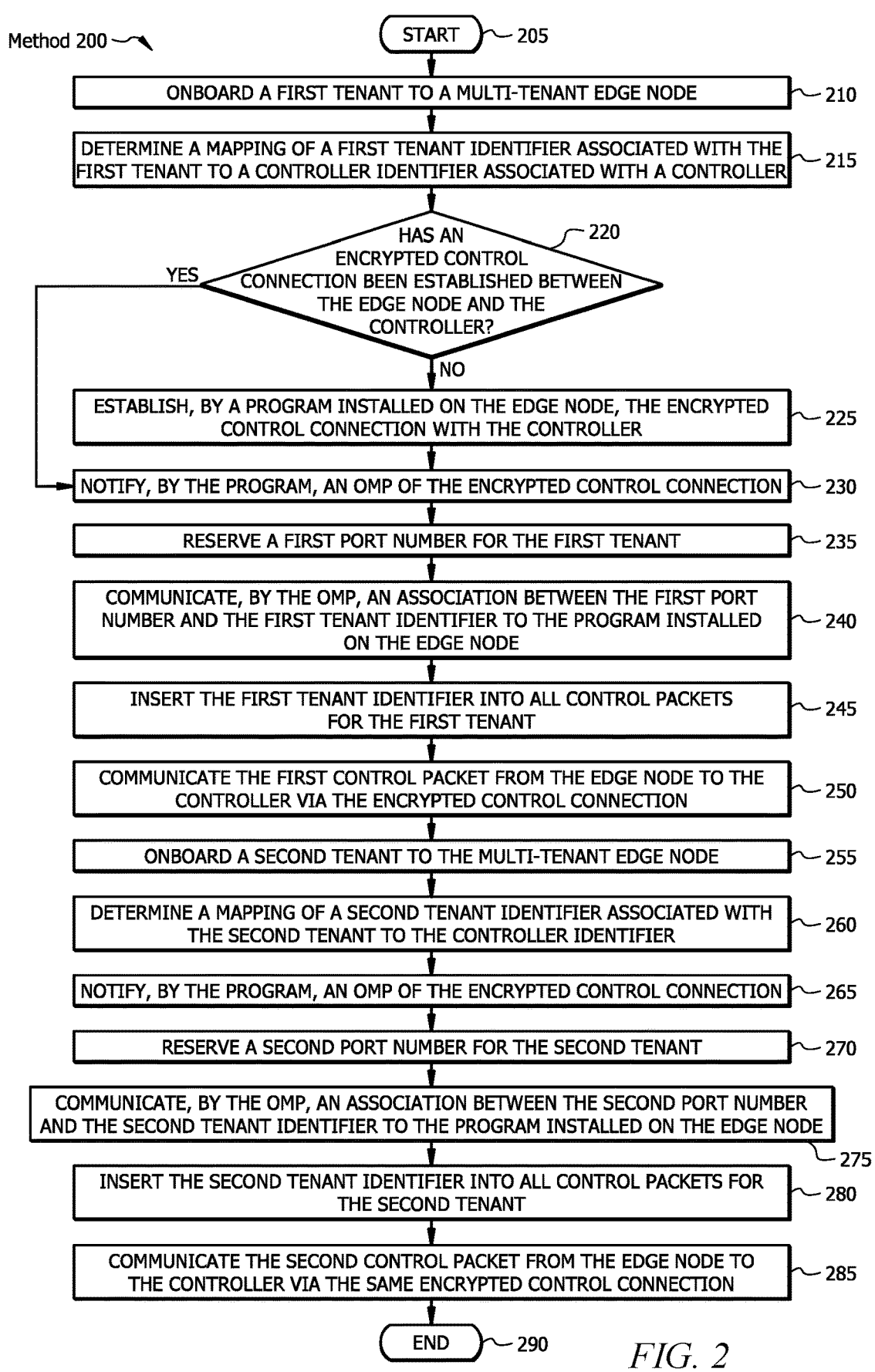
FIG. 2 illustrates an example method for sharing a control connection in an SD-WAN environment.

FIG. 2 illustrates an example method 200 for sharing a control connection in an SD-WAN environment. Method 200 begins at step 205. At step 210 of method 200, a first tenant is onboarded to a multi-tenant edge node. In certain embodiments, the first tenant is onboarded from a network management system. For example, referring to FIG. 1, edge node 140 onboards (see notation 192) tenant 132a from a network management system of management node 130. Method 200 then moves from step 210 to step 215, where the multi-tenant edge node determines a mapping of a first tenant identifier associated with the first tenant to a controller identifier associated with a controller. In certain embodiments, the multi-tenant edge node receives the mapping from an orchestrator node. For example, referring to FIG. 1, edge node 140 may communicate (see notation 193) a request for information associated with tenant 132a to orchestrator node 150, and orchestrator node 150 may, in response to receiving the request, communicate (see notation 194) tenant-controller map 136 to edge node 140. Method 200 then moves from step 215 to step 220.

At step 220 of method 200, the edge node determines whether an encrypted control connection has been established between the edge node and the controller. For example, referring to FIG. 1, edge node 140 may determine whether daemon 170a has established connection 160 (e.g., a DTLS connection) with controller 120 of system 100. If the edge node determines that an encrypted control connection has been established between the edge node and the controller, method 200 advances from step 220 to step 230. If the edge node determines that an encrypted control connection has not been established between the edge node and the controller, method 200 moves from step 220 to step 225, where a program installed on the edge node establishes the encrypted control connection with the controller. For example, referring to FIG. 1, daemon 170a installed on edge node 140 may establish connection 160 with controller 120. Method 200 then moves from step 225 to step 230.

At step 230 of method 200, the program installed on the edge node notifies an OMP of the established encrypted control connection. For example, referring to FIG. 1, daemon 170a installed on edge node 140 notifies OMP 124 of established connection 160. Method 200 then moves from step 230 to step 235, where the edge node reserves a first port number for the first tenant. For example, referring to FIG. 1, OMP 124 of edge node 140 may reserve port number 182a for tenant 132a. In certain embodiments, OMP generates a tenant-port map that maps tenant identifiers to reserved port numbers. For example, referring to FIG. 1, OMP of edge node 140 may generate tenant-port map 180, which includes a mapping of tenant identifier 134a to port number 182a. Method 200 then moves from step 235 to step 240.

At step 240 of method 200, the OMP communicates an association between the first port number and the first tenant identifier to the program installed on the edge node. For example, referring to FIG. 1, OMP 124 communicates an association between tenant identifier 134a and port number 182a to daemon 170a. Method 200 then moves from step 240 to step 245, where the edge node inserts the first tenant identifier into the control packets for the first tenant. For example, referring to FIG. 1, daemon 170a installed on edge node 140 may insert tenant identifier 134a into packets 164a for tenant 132a. Method 200 then moves from step 245 to step 250.

At step 250 of method 200, the edge node communicates the first control packet from the edge node to the controller via the encrypted control connection. For example, referring to FIG. 1, daemon 170a of edge node 140 may communicate packet 164a to controller 120. Method 200 then moves from step 250 to step 255, where a second tenant is onboarded to the multi-tenant edge node. In certain embodiments, the second tenant is onboarded from a network management system. For example, referring to FIG. 1, edge node 140 onboards (see notation 192) tenant 132b from a network management system of management node 130. Method 200 then moves from step 255 to step 260, where the multi-tenant edge node determines a mapping of a second tenant identifier associated with the second tenant to the controller identifier associated with the controller. In certain embodiments, the multi-tenant edge node receives the mapping from an orchestrator node. For example, referring to FIG. 1, edge node 140 may communicate (see notation 193) a request for information associated with tenant 132b to orchestrator node 150, and orchestrator node 150 may, in response to receiving the request, communicate (see notation 194) tenant-controller map 136 to edge node 140. Tenant-controller map 136 includes a mapping of tenant identifier 134b associated with tenant 132b to controller identifier 122 associated with controller 120. Method 200 then moves from step 260 to step 265.

At step 265 of method 200, the program installed on the edge node notifies the OMP of the established encrypted control connection. For example, referring to FIG. 1, daemon 170a installed on edge node 140 notifies OMP 124 of established connection 160. Method 200 then moves from step 265 to step 270, where the edge node reserves a second port number for the second tenant. For example, referring to FIG. 1, OMP 124 of edge node 140 may reserve port number 182b for tenant 132b. In certain embodiments, OMP generates a tenant-port map that maps tenant identifiers to reserved port numbers. For example, referring to FIG. 1, OMP of edge node 140 may generate tenant-port map 180, which includes a mapping of tenant identifier 134b to port number 182b. Method 200 then moves from step 270 to step 275.

At step 275 of method 200, the edge node communicates an association between the first port number and the first tenant identifier to the program installed on the edge node. For example, referring to FIG. 1, OMP 124 of edge node 140 communicates an association between tenant identifier 134b and port number 182b to daemon 170a. Method 200 then moves from step 275 to step 280, where the edge node inserts the second tenant identifier into the control packets for the second tenant. For example, referring to FIG. 1, daemon 170a installed on edge node 140 may insert tenant identifier 134b into packets 164b for tenant 132b. Method 200 then moves from step 280 to step 285.

At step 285 of method 200, the edge node communicates the second control packet from the edge node to the controller via the encrypted control connection. For example, referring to FIG. 1, daemon 170a of edge node 140 may communicate packet 164b to controller 120 using peering session 162b via connection 160. Method 200 then moves from step 285 to step 290, where method 200 ends. As such, by multiplexing tenant 132a and tenant 132b (and potentially several other tenants 132) onto single shared control connection 160, controller 120 is more efficiently utilized to achieve higher scalability Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method 200 for sharing a control connection in an SD-WAN environment including the particular steps of the method of FIG. 2, this disclosure contemplates any suitable method for sharing a control connection in an SD-WAN environment, which may include all, some, or none of the steps of the method of FIG. 2, where appropriate. Although FIG. 2 describes and illustrates particular components, devices, or systems carrying out particular actions, this disclosure contemplates any suitable combination of any suitable components, devices, or systems carrying out any suitable actions.

Figure 3:
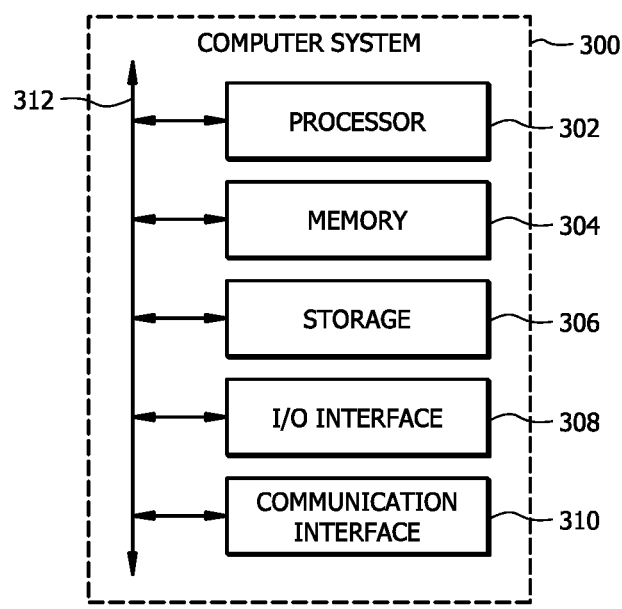
FIG. 3 illustrates an example computer system that may be used by the systems and methods described herein.

FIG. 3 illustrates an example computer system 300. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An edge router comprising one or more processors and one or more computer-readable non-transitory storage media coupled to the one or more processors and including instructions that, when executed by the one or more processors, cause the router to perform operations comprising:
    onboarding a first tenant from a network management system;
    determining a mapping of a tenant identifier associated with the first tenant to a controller identifier associated with a controller;
    reserving a port number in a kernel for the first tenant;
    inserting the tenant identifier into a first control packet;
    communicating the first control packet to the controller via an encrypted control connection during a first peering session, wherein the first peering session shares the encrypted control connection with a second peering session; and
    establishing, by a daemon installed on the edge router, the encrypted control connection with the controller,
    wherein the tenant identifier is a global, 16-bit identifier that uniquely identifies the first tenant.

2. The edge router of claim 1, the operations further comprising onboarding a second tenant from the network management system, wherein:
    the first tenant is associated with the first peering session and a first virtual routing and forwarding (VRF) instance;
    and the second tenant is associated with the second peering session and a second VRF instance.

3. The edge router of claim 2, wherein the controller uses the tenant identifier to determine the first VRF instance.

4. The edge router of claim 1, the operations further comprising:
    notifying, by the daemon, an Overlay Management Protocol (OMP) of the encrypted control connection;
    and communicating, by the OMP, an association between the port number and the tenant identifier to the daemon.

5. The edge router of claim 1, the operations further comprising:
    receiving a second control packet from the controller via the encrypted control connection;
    decrypting the second control packet;
    identifying a destination port associated with the second control packet;
    writing the second control packet to the kernel, and determining, by the kernel, to place the second control packet on a socket based on the destination port.

6. The edge router of claim 1, wherein:
    the encrypted control connection is a Datagram Transport Layer Security (DTLS) control connection;
    the router is a multi-tenant software-defined wide area network (SD-WAN) edge router;
    and the port is a Transmission Control Protocol (TCP) port.

7. A method, comprising:
    onboarding, by an edge router, a first tenant from a network management system;
    determining, by the edge router, a mapping of a tenant identifier associated with the first tenant to a controller identifier associated with a controller;
    reserving, by the edge router, a port number in a kernel for the first tenant;
    inserting, by the edge router, the tenant identifier into a first control packet;
    and communicating, by the edge router, the first control packet to the controller via an encrypted control connection during a first peering session, wherein the first peering session shares the encrypted control connection with a second peering session; and
    establishing, by a daemon installed on the edge router, the encrypted control connection with the controller,
    wherein the tenant identifier is a global, 16-bit identifier that uniquely identifies the first tenant.

8. The method of claim 7, further comprising onboarding a second tenant from the network management system, wherein:
    the first tenant is associated with the first peering session and a first virtual routing and forwarding (VRF) instance;
    and the second tenant is associated with the second peering session and a second VRF instance.

9. The method of claim 8, wherein the controller uses the tenant identifier to determine the first VRF instance.

10. The method of claim 7, further comprising:
notifying, by the daemon, an Overlay Management Protocol (OMP) of the encrypted control connection;
and communicating, by the OMP, an association between the port number and the tenant identifier to the daemon.

11. The method of claim 7, further comprising:
receiving a second control packet from the controller via the encrypted control connection;
decrypting the second control packet;
identifying a destination port associated with the second control packet;
writing the second control packet to the kernel, and determining, by the kernel, to place the second control packet on a socket based on the destination port.

12. The method of claim 7, wherein:
the encrypted control connection is a Datagram Transport Layer Security (DTLS) control connection;
the router is a multi-tenant software-defined wide area network (SD-WAN) edge router;
and the port is a Transmission Control Protocol (TCP) port.

13. One or more computer-readable non-transitory storage media embodying instructions that, when executed by a processor, cause the processor to perform operations comprising:
onboarding a first tenant from a network management system;
determining a mapping of a tenant identifier associated with the first tenant to a controller identifier associated with a controller;
reserving a port number in a kernel for the first tenant;
inserting the tenant identifier into a first control packet;
communicating the first control packet to the controller via an encrypted control connection during a first peering session, wherein the first peering session shares the encrypted control connection with a second peering session; and
establishing, by a daemon installed on an edge router, the encrypted control connection with the controller,
wherein the tenant identifier is a global, 16-bit identifier that uniquely identifies the first tenant.

14. The one or more computer-readable non-transitory storage media of claim 13, the operations further comprising onboarding a second tenant from the network management system, wherein:
the first tenant is associated with the first peering session and a first virtual routing and forwarding (VRF) instance;
and the second tenant is associated with the second peering session and a second VRF instance.

15. The one or more computer-readable non-transitory storage media of claim 14, wherein the controller uses the tenant identifier to determine the first VRF instance.

16. The one or more computer-readable non-transitory storage media of claim 13, the operations further comprising:
notifying, by the daemon, an Overlay Management Protocol (OMP) of the encrypted control connection;
and communicating, by the OMP, an association between the port number and the tenant identifier to the daemon.

17. The one or more computer-readable non-transitory storage media of claim 13, the operations further comprising:
receiving a second control packet from the controller via the encrypted control connection;
decrypting the second control packet;
identifying a destination port associated with the second control packet;
writing the second control packet to the kernel, and determining, by the kernel, to place the second control packet on a socket based on the destination port.

* * * * *